United States Patent [19]
O'Haver-Smith

[11] Patent Number: 6,001,496
[45] Date of Patent: Dec. 14, 1999

[54] MAT-FACED GYPSUM BOARD AND METHOD OF MANUFACTURING SAME

[75] Inventor: Debbie O'Haver-Smith, Lilburn, Ga.

[73] Assignee: G-P Gypsum Corporation, Atlanta, Ga.

[21] Appl. No.: 08/689,986

[22] Filed: Aug. 16, 1996

Related U.S. Application Data

[60] Provisional application No. 60/022,499, Aug. 18, 1995.

[51] Int. Cl.$^6$ ...................................................... B32B 9/00
[52] U.S. Cl. .......................... 428/703; 428/141; 428/143; 428/172; 428/219; 428/220; 428/312.4; 428/337; 428/393; 428/411.1; 428/537.5; 428/920; 427/389.8; 156/39; 156/71; 52/309.1; 52/309.17; 52/408
[58] Field of Search ..................................... 428/290, 703, 428/172, 393, 312.4, 411.1, 920, 219, 220, 283, 284, 285, 332, 337, 141, 143, 251, 537.5; 52/408, 309.1, 309.17, 783.1, 794.1; 156/39, 41, 71; 427/389.8

[56] References Cited

U.S. PATENT DOCUMENTS

| | | | |
|---|---|---|---|
| 4,233,353 | 11/1980 | Bondoc et al. | 428/141 |
| 4,647,496 | 3/1987 | Lehnert et al. | 428/251 |
| 4,810,569 | 3/1989 | Lehnert et al. | 428/285 |
| 4,879,173 | 11/1989 | Randall | 428/285 |
| 5,148,645 | 9/1992 | Lehnert et al. | 52/443 |
| 5,220,762 | 6/1993 | Lehnert et al. | 52/408 |
| 5,319,900 | 6/1994 | Lehnert et al. | 52/408 |
| 5,342,680 | 8/1994 | Randall | 428/285 |
| 5,371,989 | 12/1994 | Lehnert et al. | 52/309 |
| 5,397,631 | 3/1995 | Green et al. | 428/219 |
| 5,552,187 | 9/1996 | Green | 427/389.8 |

*Primary Examiner*—William Krynski
*Assistant Examiner*—Abraham Bahta
*Attorney, Agent, or Firm*—Synnestvedt & Lechner

[57] ABSTRACT

Disclosed is a mat-faced gypsum board of the general type having a gypsum-based core formed from a gypsum slurry compressed through an extrusion ratio of at least about 3:1 wherein the fibrous mat facing on at least one side of the board has a weight per unit surface area of greater than about 1.85 lb./100 ft.$^2$ and consists essentially of inorganic fibers having a diameter of less than about 15 microns. Also disclosed are methods for manufacturing such a gypsum board and the use of such a gypsum board in exterior finishing systems, interior lath systems and as a door core.

27 Claims, 2 Drawing Sheets

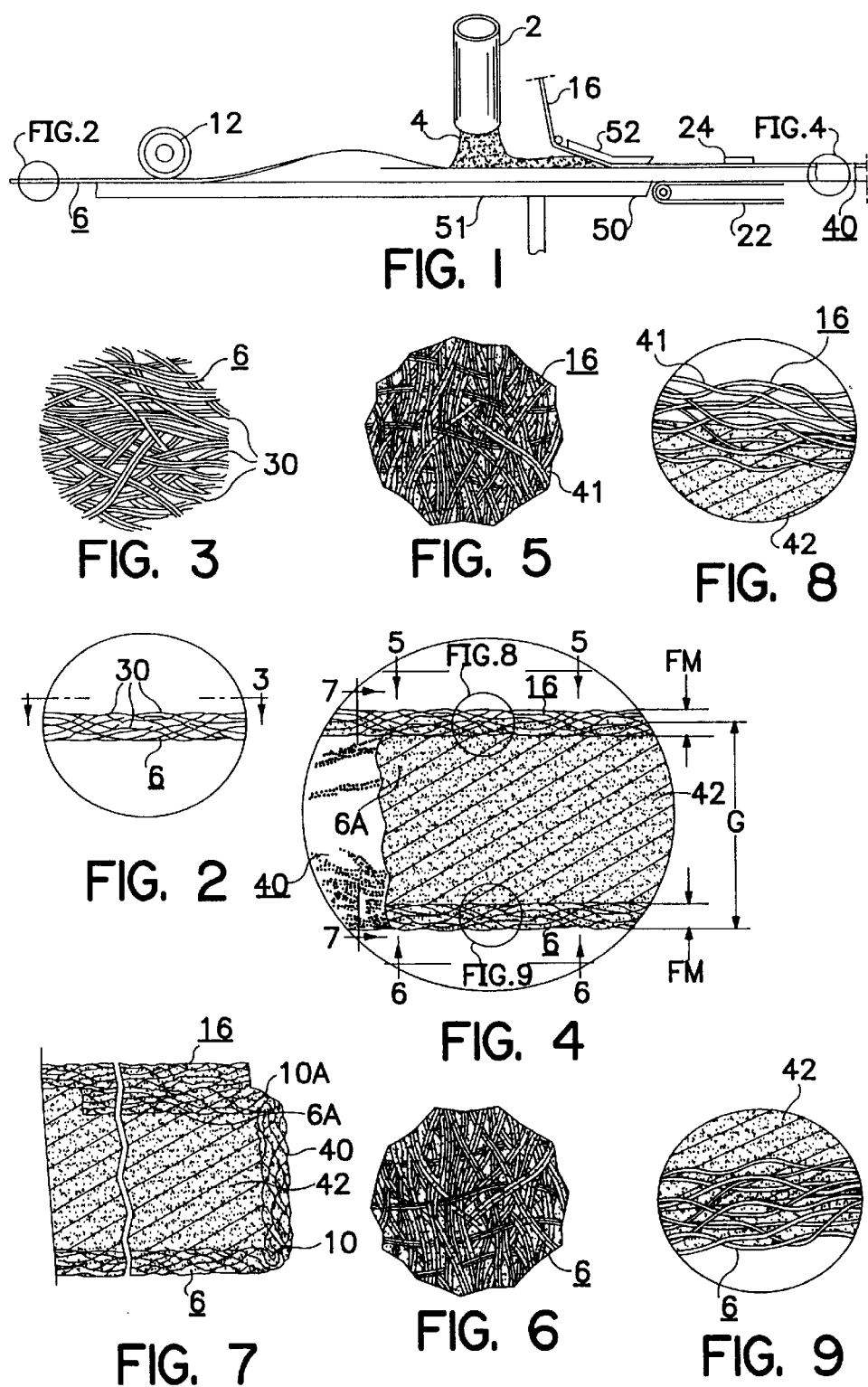

MAT-FACED GYPSUM BOARD AND METHOD OF MANUFACTURING SAME

RELATED APPLICATION

This application claims the benefit of prior filed, co-pending U.S. Provisional Application 60/022,499, filed Aug. 18, 1995.

FIELD OF THE INVENTION

The present invention relates to improvements in gypsum board and to methods of manufacturing gypsum board. More particularly, the present invention is directed to board of the type which is faced on at least one side thereof with a fibrous mat.

BACKGROUND OF THE INVENTION

Panels of gypsum board having a core of set gypsum reinforced or faced on the outer surfaces thereof by sheets of facing material have long been used in the fabrication of buildings. For example, such members are commonly used as components in fabricating partitions or walls for rooms, elevator shafts, stairwells, ceilings, roof decks and the like. Although paper sheets have long been used as the reinforcing material for gypsum board of this type, facing materials formed of fibrous mat, such as a glass fiber mat, have enjoyed a substantial increase in popularity. This popularity is due in large part to the technologies described in the following U.S. Patents: U.S. Pat. No. 4,647,496; U.S. Pat. No. 4,810,569; U.S. Pat. No. 4,849,173; U.S. Pat. No. 5,148,645; U.S. Pat. No. 5,220,762; U.S. Pat. No. 5,319,900; U.S. Pat. No. 5,342,680; U.S. Pat. No. 5,371,989 and U.S. Pat. No. 5,397,631, each of which has been assigned to the assignee of the present invention and incorporated herein by reference. These patents disclose, generally, gypsum board reinforced on at least one surface thereof with a fibrous mat comprising glass fibers bound together by an adhesive binder.

Gypsum board products of the type disclosed in the above patents have been commercialized and are presently being used effectively in an increasing number of applications. Such applications include those in which conventional paper-faced gypsum board is considered unsuitable for use or in which the use of fibrous mat-faced gypsum board has been recognized to provide an advantage.

Gypsum board is generally manufactured by a method which includes dispersing a gypsum slurry onto a moving sheet of a fibrous mat. The mat is typically supported by equipment such as forming tables, support belts, carrier rolls and/or the like. A second sheet of fibrous mat is then fed from a roll onto the top of the slurry, thereby sandwiching the slurry between two moving fibrous mats. Forming means, such as forming or shaping rolls, are utilized to compress the slurry to the desired thickness. The gypsum slurry is allowed to at least partially set and then sequential lengths of board are cut and further processed by exposure to heat, which accelerates the drying of the board by increasing the rate of evaporation of excess water from the gypsum slurry.

Because the board is dried after the fibrous mats have been placed thereon, it is known that the mats should be sufficiently porous to permit the excess water to evaporate at an acceptable rate. On the other hand, excessive penetration of the slurry through the mat and onto the underlying support surfaces and equipment are highly undesirable. Accordingly, certain prior art techniques have utilized a fibrous mat joined to a release-paper backing to help prevent soiling of support equipment by the slurry which would otherwise leak through the mat. This release-paper is typically removed and discarded after processing is complete. Utilization of such a mat, however, adds unwanted cost and complexity to the manufacturing process and is therefore undesirable.

A highly successful and effective method for minimizing soiling of support equipment by the gypsum slurry is disclosed in U.S. Pat. No. 4,810,569. This patent discloses that excessive slurry penetration can be substantially avoided by adjusting the viscosity of the slurry so that penetration of the slurry into the mat is controlled. The recommended technique for controlling the viscosity of the slurry is to add thereto a viscosity-control agent, such as paper fiber, cellulosic thickeners, bentonite clays and starches.

Although the viscosity-control techniques identified in the '569 patent are valuable and widely used for the purpose of preventing excessive slurry bleed-through, applicant has found that in certain circumstances such techniques are less than fully effective and/or undesirable for other reasons. For example, adjusting the content of certain viscosity-control agents, such as paper fibers, can have an undesirable or unwanted impact on the physical or other properties of the resulting board. In addition, applicant has found that in certain circumstances viscosity-control techniques, when used alone, can not control slurry penetration to the extent desired. For example, applicant has found that difficulties with the control of slurry bleed-through occur when viscosity-control techniques are utilized alone to form relatively thin gypsum board products and/or when relatively high compression force techniques are used to shape and form the slurry.

SUMMARY OF THE INVENTION

Applicant has found that the disadvantages and difficulties of the prior art are overcome by a mat-reinforced gypsum board comprising a gypsum-based core and a fibrous mat facing reinforcing at least one side of said core, the fibrous mat having a weight per unit surface area of greater than about 1.85 lb. per 100 sq. ft. and comprising a major proportion of inorganic fibers having a diameter of less than about 15 microns. According to preferred embodiments, the gypsum-based core has a substantially uniform thickness of no greater than about 0.375 inch and the fibrous mat consists essentially of inorganic fibers having a diameter of greater than about 10 microns to less than about 15 microns.

The process aspects of the present invention also overcome certain difficulties associated with prior art processes. More particularly, the present invention provides a process especially well adapted for the production of relatively thin gypsum board without excessive gypsum-bleed through during the production thereof. The preferred process comprises (a) providing a porous fibrous mat having a weight per unit surface area of greater than about 1.85 lb. per 100 sq. ft. and comprising in major proportion inorganic fibers having a diameter of less than about 15 microns; (b) bringing a gypsum slurry into contact with the mat; and (c) exerting a compressive force on the slurry by exposing the mat/slurry combination to an extrusion ratio of at least about 3:1.

Applicants have found that gypsum boards in accordance with the present invention can be used to advantage in exterior finishing systems (including exterior insulation finishing systems) disclosed, for example, in U.S. Pat. Nos. 4,647,496 and 4,810,569, in roof deck systems, disclosed, for example, in U.S. Pat. No. 5,319,900, and in interior plaster lath systems, disclosed, for example, in U.S. Pat. No. 5,220,762.

BRIEF DESCRIPTION OF THE DRAWINGS

FIG. 1 is a somewhat diagrammatic, fragmentary side elevational view illustrating portions of a manufacturing line of a type suitable for use in the manufacture of gypsum board in accordance with the present invention;

FIG. 2 is an enlarged fragmentary sectional view taken as indicated toward the left of FIG. 1 of an underlying fiberglass mat used in manufacture of the gypsum board;

FIG. 3 is a fragmentary plan view taken as indicated by line 3—3 on FIG. 2;

FIG. 4 is an enlarged sectional view taken as indicated toward the right of FIG. 1 and illustrating one embodiment of the present invention;

FIG. 5 is a fragmentary plan view taken as indicated by line 5—5 on FIG. 4;

FIG. 6 is a fragmentary bottom view taken as indicated by line 6—6 on FIG. 4 and illustrating the bottom surface of the underlying mat of the board;

FIG. 7 is a transverse sectional view of an edge portion of the completed board, this view being taken as indicated by line 7—7 on FIG. 4;

FIG. 8 is a further enlarged fragmentary sectional view taken as indicated toward the top of FIG. 4;

FIG. 9 is a further enlarged fragmentary sectional view taken as indicated toward the bottom of FIG. 4;

DESCRIPTION OF PREFERRED EMBODIMENTS

I. The Gypsum Board

Figure 10:
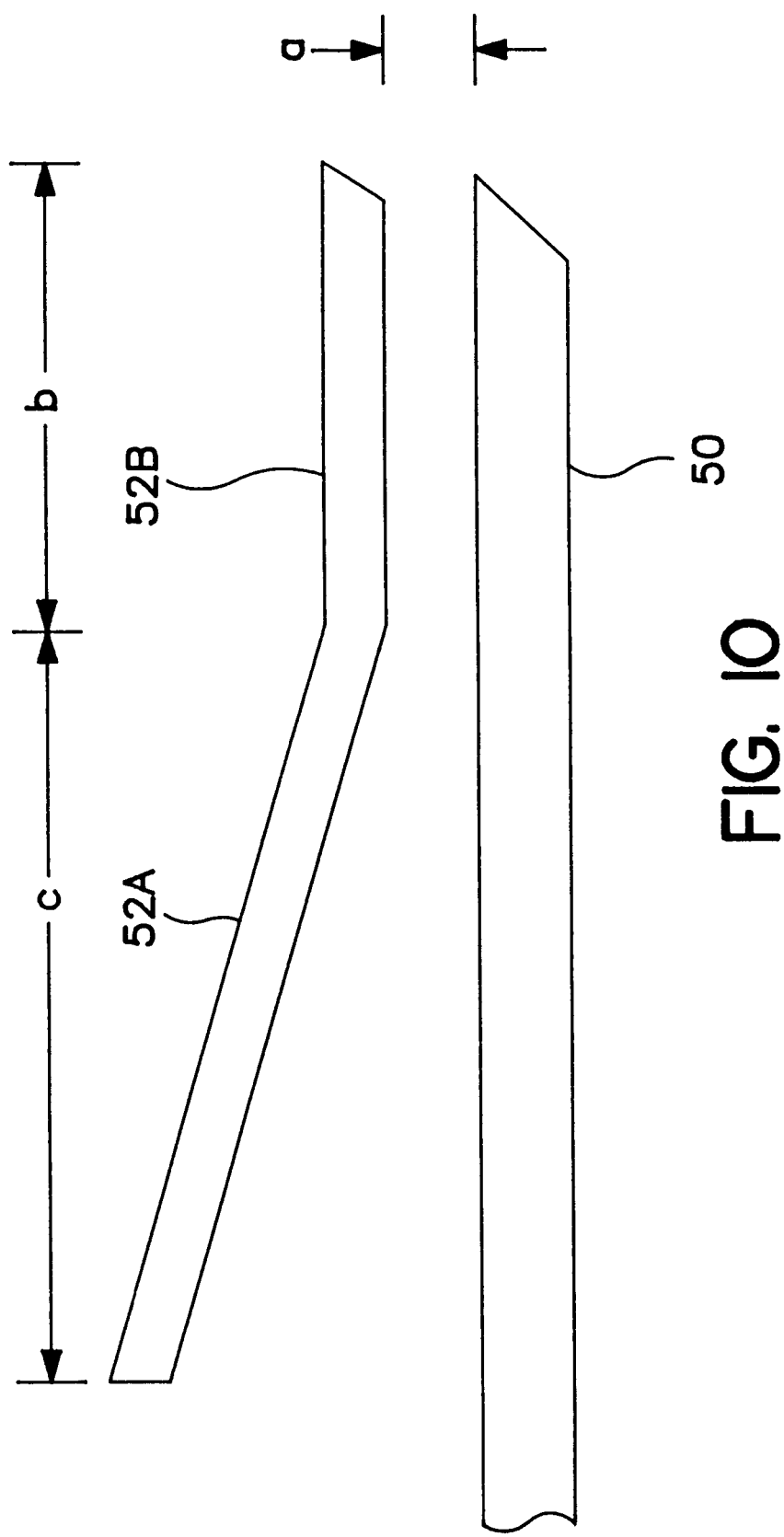
FIG. 10 is an enlarged semi-schematic view of the extrusion wedge shown in FIG. 1.

An important aspect of the present invention is the provision of mat-faced gypsum products which include a fibrous mat in accordance with the present invention. The mat-faced gypsum board of the present invention comprises a set gypsum core reinforced with a fibrous mat as described herein. The term "mat-faced" is used herein to mean that the mat is located at or near the surface of the board, and thus contemplates boards in which the mat is below the surface of the board as a result of embedment in a surface coating, as well as mats which are substantially free of set gypsum on the outer surface thereof.

A. The Fibrous Mats

Applicant has surprisingly found that exceptional and unexpected improvement in gypsum board features, such as gypsum bleed-through, can be achieved with fibrous mats having the characteristics required by the present invention. More particularly, applicant has found that fibrous mats which comprise, and preferably consist essentially of, fibers having a diameter of no greater than about 15 microns can be utilized with great advantage in the production of mat-faced gypsum board. As used herein, the term "diameter" refers to the thickness of fibers that do not have a substantially circular cross section. As illustrated by the Examples hereinbelow, applicant has discovered that fiber size has a significant influence on several important features of such mat-faced gypsum board products. Accordingly, the present gypsum boards preferably include fibrous mats in which the fibers thereof comprise in major proportion, more preferably comprise at least about 75% and even more preferably consist essentially of, fibers having a diameter no less than about 10 microns and no greater than about 15 microns. The use of mats having diameters of less than about 10 microns is undesirable because it is believed that the peel-strength and bonding ability of such mats precludes the use of such boards in certain applications. On the other hand, applicant has found that the use of mats with fiber diameters greater than about 15 microns results in gypsum board which is especially susceptible to excessive gypsum slurry penetration during the manufacture of certain forms of such boards.

Applicant has also discovered that the weight per unit surface area of the fibrous mat has an important influence on the ability of the mat to resist slurry bleed-through during processing of the board. More specifically, it is preferred that the fibrous mat have a weight per unit surface area of at least about 1.85, and even more preferable at least about 1.95 lb./100 sq. ft., provided that the fibers of the mat have diameters predominantly of less than about 15 microns. Thus, mats formed from fibers having diameters predominantly of about 16 microns or greater do not fully satisfy the objects of the invention, even when such mats have a relatively high weight per unit surface area, such as 2.1 lb./100 sq. ft. and greater. For example, slurry bleed-through can not be adequately controlled when such mats are utilized in relatively thin gypsum boards, such as gypsum boards having thicknesses of less than about 0.375 inch, when the preferred slurry compression techniques described herein are utilized to form the board. In contrast, mats of the present invention resist bleed-through in such applications. This bleed-through resistance is unexpected, and the reason for the bleed-through resistance of the present mats is not fully understood. According to especially preferred embodiments, the fibrous mats of the present invention consist essentially of substantially randomly distributed fibers having a diameter of about 13 microns and having a weight of about 2.1 lb./100 sq. ft., such mats being especially preferred for use with gypsum boards having a thickness of less than about ½ inch. Such mats are available from Schuller Manufacturing under the trade designation Dura-Glass 7594. The preferred mats of the present invention have an air permeability of less than about 700, and even more preferably of about 600 CFM/sq. ft. (test method FG 436-910).

Fibrous mats in accordance with the present invention generally comprise fibers and binder for the fibers. The fibrous mats may comprise randomly oriented fibers or fibers oriented in a regular pattern, such as a woven pattern. In addition, it is contemplated that the fibrous mats of the present invention may include portions thereof in which certain of the fibers are randomly distributed and in which other portions thereof are in a pattern configuration. In general, however, the use of fibrous mats having fibers randomly oriented with respect to one another is preferred primarily due to cost factors. The fiber from which the mat is formed can comprise continuous discrete strands of fibers and/or chopped strand. The mat can range in thickness, for example, from about 15 to about 40 mils, with a thickness of about 25 to about 40 mils being preferred and thicknesses of about 36 mils being even more preferred.

In highly preferred form, the mat is a mat in which the fibrous portion thereof comprises in major proportion, more preferably at least about 75% and even more preferably consists essentially of inorganic fibers, with glass fibers being preferred. It will be appreciated, however, that organic fibers, such as polyester fibers, may be used in minor proportion. The fibers are preferably bound together with a resinous adhesive.

Mats which are formed predominantly from glass fibers are known in the art and referred to herein as glass fiber mats. Thus, the preferred fibrous mats of the present invention are glass fiber mats in which the fibrous portion thereof is comprised of at least about 50% by weight of glass fibers, and more preferably at least about 75% by weight of glass fibers.

B. The Gypsum Core

The preferred boards of the present invention include a gypsum core of the type used in gypsum-based products commonly known as gypsum wallboard, drywall, gypsum board, gypsum lathe, gypsum panel and gypsum sheathing. The preferred core is formed by mixing water with powdered anhydrous calcium sulfate ($CaSO_4$) or calcium sulfate hemihydrate ($CaSO_4.\frac{1}{2}H_2O$), also known as calcined gypsum, and thereafter allowing the mixture to hydrate or set into calcium sulfate dihydrate ($CaSO_4.2H_2O$), a relatively hard material. The core of the product generally comprises a major proportion of gypsum, and preferably at least about 85 wt. % of set gypsum.

The composition from which the set gypsum core is made can include optional constituents, including, for example, those included conventionally in fire-resistant gypsum board and in water-resistant gypsum board. Examples of such constituents include set accelerators, retarders, foaming agents, dispersing agents, water resistant additives and fire resistant additives.

In many applications, it is desirable for the core of the fibrous mat-faced gypsum board to include a water resistant additive, preferably in an amount such that the core absorbs no more than about 10% by weight, and preferably no more than about 5% by weight, of water when tested in accordance with ASTM method C-473. One such application includes use of such a board as a member for a built-up roof, as disclosed in U.S. Pat. No. 5,342,680, which has been assigned to the assignee of the present invention and which is incorporated in its entirety herein by reference. Preferred materials for use in improving the water resistant properties of such gypsum board are disclosed in detail in the aforesaid patent.

The core material of the present invention also optionally includes fire resistant additives, preferably of the type and in the amounts disclosed in U.S. Pat. No. 4,664,707, which is incorporated herein by reference.

The gypsum core may also include viscosity control agents of the type and in the amounts disclosed in U.S. Pat. No. 4,647,496.

II. Preferred Processes

It is contemplated that numerous and varied processing techniques may be used to form the gypsum board of the present invention. Nevertheless, applicant has found that unexpectedly superior results can be achieved when the processing steps and conditions described herein are utilized.

The preferred processes of the present invention include the step of providing a fibrous mat as described herein above. More specifically with reference to FIG. 1, a moving sheet of fibrous mat 6 preferably of indefinite length is provided. This mat is preferably fed from a roll (not shown) of the mat. The fibrous mat preferably is of from about 25 mils to about 40 mils in thickness, has a weight of greater than about 1.9 lb./100 sq. ft., and consists essentially of substantially randomly distributed glass fibers having a diameter of greater than about 10 microns and less than about 15 microns.

The preferred processes also include the step of dispensing a gypsum slurry on the moving substrate. With particular reference to FIG. 1, dry ingredients (not shown) from which the gypsum core of the present invention is formed are preferably pre-mixed and then fed to a mixer of the type commonly referred to as a pin mixer 2. Water and other liquid constituents (not shown) used in making the core are metered into the pin mixer 2 where they are combined with the dry ingredients to form an aqueous gypsum slurry. Foam is generally added to the slurry in the pin mixer to control the density of the resulting core. The slurry 4 is dispensed through one or more outlets at the bottom of the pin mixer onto the moving sheet of fibrous mat 6.

As is common in the manufacture of gypsum board, the two opposite edge portions of the fibrous mat 6 are preferably progressively flexed upwardly from the mean plane of the mat 6, then turned inwardly, scored and/or creased at the margins so as to provide coverings for the edges of the resulting board 40. In FIG. 1, this progressive flexing and shaping of the edges of the mat 6 are shown for only one side edge of the mat and the conventional guiding devices which are ordinarily employed for this purpose are omitted from the figure for the sake of clarity. FIG. 7 shows an edge of the set gypsum core 42 covered by the overlapped edge portion 6a of the mat 6. FIG. 7 shows also score and/or crease marks 10 and 10a of the mat 6, the score and/or crease marks permitting formation of good edges and flat surfaces. The score and/or crease marks 10 and 10a are preferably made by a conventional scoring wheel 12 or creasing device. An advantage of using the preferred form of glass fiber mat is that it is capable of being scored, creased and/or edged like a conventional paper facing.

Another sheet of fibrous mat 16 according to the present invention is fed from a roll (not shown) onto the top of the slurry 4, thereby sandwiching the slurry between the two moving fibrous mats which form facings of the set gypsum core 42 which is formed from the slurry.

An important step according to the present process is exerting a compression force onto said sandwiched slurry. that is the slurry which has been contacted on each major surface with a reinforcing sheet. It is contemplated that numerous means and techniques can be utilized to perform this step. However, it is highly preferred that the compression step comprise introducing the moving slurry to a compression contact length of at least about 4 inches, more preferably at least about 6 inches, and even more preferably at least about 8 inches. As used herein, the term "compression contact length" refers to the machine-length distance over which the slurry is exposed to compression surfaces. While it is contemplated that numerous devices and techniques can be utilized to carry out the compression step hereof, such as forming and shaping rolls, it is generally preferred that an extrusion wedge of the general type illustrated in FIGS. 1 and 10 be utilized.

With particular reference now to FIG. 1, the slurry is preferably introduced into an extrusion wedge formed by the combination of the lower extrusion plate 50 (which in the embodiment shown in the Figures is formed as part of the forming table designated generally as 51) and the upper extrusion plate 52. The extrusion wedge produces a compression force on the slurry and compresses the slurry to the desired thickness. With additional reference to FIG. 10, the upper plate includes a portion 52B which is substantially parallel to the bottom plate 50 and a portion 52A which is angularly inclined with respect to portion 52B and to plate 50. The thickness of the board is defined by the extrusion gap, designated as "a" in the figure, between the portion 52B of the upper plate 52 and the bottom plate 50.

For extrusion wedges of the type illustrated herein, the compression contact length is at least the dimension "b" in FIG. 10. More specifically, the slurry 4 (not shown in FIG. 10) is exposed to compression force for at least the entire time it is in the gap between the upper plate portion 52B and the lower plate 50. Thus, the compression contact length is generally at least the dimension "b" for extrusion wedges of the type shown in the figures.

Applicant has found that extrusion wedges of the type disclosed in the figures can beneficially increase the uniformity of the core thickness of the resulting gypsum board in comparison to other slurry compression techniques. On the other hand, the high compression contact lengths preferred herein tend to produce an undesirable increase in the tendency of the slurry to excessively bleed through the mats which are used to sandwich the slurry and which ultimately become the facing or reinforcement of the finished board. Applicant has found that this tendency is especially severe for processes in which the compression contact length is long and in which the extrusion gap is relatively small. Thus, the processes of the present invention are especially preferred for use when the ratio of compression contact length to extrusion gap is at least about 3:1, more preferably at least about 16:1, and even more preferably at least about 32:1. For the purposes of convenience, this ratio is referred to herein as the "extrusion ratio." It will be appreciated, however, that this term applies to and can be used to describe other means for exerting a compression force on the slurry, such as shaping and forming rolls.

According to preferred embodiments, the extrusion wedge in accordance with the process of the present invention has a compression contact length (dimension "b" in FIG. 10) of about 8 inches and an extrusion gap (dimension "a" in FIG. 10) of less than about ½ inch, and even more preferably less than about ⅜ inch. This produces an extrusion ratio of greater than about 16:1, and even more preferably greater than about 21:1. According to certain preferred embodiments, the dimension designated as "c" in FIG. 10 is about 17 inches.

After passing through the means for exerting compression on the slurry, the mats 6 and 16 with the slurry 4 sandwiched therebetween are received on a conveyor belt 22. Conventional edge guiding devices, as indicated at 24, shape and maintain the edges of the composition until the gypsum has set sufficiently to retain its shape. In due course, the sequential lengths of the board are cut and further processed by exposure to heat which accelerates the drying of the board by increasing the rate of evaporation of excess water in the gypsum slurry. With reference to FIG. 7, it has been observed that the set gypsum of the core 42 is effective in forming satisfactory bonds with the mats and between the edge portions of the overlying mat 16 and the overlapped edge portion 6a of the underlying mat 6, thus making it unnecessary to use a bond improver in the slurry or an edge paste to form the aforementioned bonds. The preferred form of mats 6 and 16, as shown in FIGS. 2 and 3, comprise glass fiber filaments 30 oriented in random pattern and bound together with resin binder (not shown). One preferred form of glass fiber mat-faced gypsum board 40 is shown in FIGS. 4 and 7. It comprises one in which the set gypsum of the core 42 penetrates at least substantially into the thickness of the mat 6 over substantial area portions thereof and in which the set gypsum of the core 42 penetrates the mat 16 partially with the surface being thus substantially free of set gypsum. The substantially gypsum-free surface of mat 16 as seen in FIG. 8 is highly textured and provides an excellent substrate for adhering thereto an overlying component. More particularly, such textured surface provides many interstices into which an adhesive composition can flow and bond. In other preferred embodiments, the set gypsum of the core 42 penetrates the mat 16 only partially, thereby leaving the outer surface of mat 16 also substantially free of set gypsum.

The phrase "substantially penetrated by set gypsum," as used herein, means that the set gypsum of the core extends from the mat surface which is contiguous to the core to the outer mat surface and coats glass fibers on the outer surface with a coating or film of set gypsum. According to certain preferred embodiments, such coating or film is sufficiently thin that the outline of the glass fibers can be see therethrough. The phrase "over substantial area portions of the outer surface," as used herein, means that at least about 30% to at least about 75% of the outer surface area of the mat is substantially penetrated by set gypsum. This preferred form of board can be formed with relatively small amounts of gypsum slurry being deposited on the underlying support surface, thus minimizing the need to clean such surfaces.

In using the preferred form of glass fiber mat, as described above, to manufacture the aforementioned preferred forms of board, development work has shown that satisfactory results can be achieved utilizing a gypsum slurry having a viscosity within the range of about 5,000 to about 7,000 centipoise (cp). As used herein, the viscosity values refer to Brookfield viscosity measured at a temperature of about 70° F. at 10 rpm utilizing paddle no. 3.

The preferred boards of the present invention include a core having a wide variety of densities, particularly those densities disclosed in U.S. Pat. No. 4,810,569, which is incorporated herein by reference.

III. Examples

COMPARATIVE EXAMPLE 1

The formulation set forth below is an example of a preferred aqueous gypsum slurry which can be used in making the core of a gypsum board product in accordance with the present invention.

| CONSTITUENTS | LBS. PER 1,000 SQ. FT. OF BOARD |
| --- | --- |
| Calcined gypsum | 1,380 |
| Water resistant agent | 10–60 |
| Paper fiber | 4–15 |
| Set accelerator | 6 |
| Ammonium lauryl sulfate (foaming agent) | 1 |
| Water | 260 |

The above formulation is used to prepare a gypsum board product, the surfaces of which are covered with non-woven fiberglass mat. The mat is composed of glass fiber filaments oriented in a random pattern and bonded together by an adhesive material. The mat has a thickness of about 36 mils and is formed from fibers having a diameter of about 16 microns. The mat has a weight per unit of surface area of about 2.1 lbs. per 100 sq. ft. and an average air permeability of 700 CFM/sq. ft./min (test method FG 436-910).

Continuous length of board is made from the above gypsum slurry and glass fiber mat on a board machine of the type shown in FIG. 1.

The slurry is fed onto a moving sheet of the mat as it is unrolled from a roll. The mat has a width of about 51 inches and is scored continuously by conventional scoring blades prior to the deposition of the slurry thereon. Each edge of the mat is scored with two score marks, with each of the outer scores being about one inch from its respective edge of the mat and each of the inner scores being about 1¼ inch from it's respective edge. Mat from another roll thereof and having a width of 47½ inches is fed onto the top of the gypsum slurry and the overlapped edge portions of the underlying mat.

After the slurry is deposited on the mat, the edges are folded at the score marks and overlapped on top of the slurry. The gypsum core formed in accordance with this example has a width of 47 and ³¹⁄₃₂ inch and a thickness of slightly greater than ¼ inch.

The top mat and the bottom mat, with the slurry sandwiched therebetween, are passed through an extrusion wedge of the type illustrated in the figures hereof. The extrusion wedge has a contact compression length ("b") of about 8 inches and an extrusion gap ("a") of slightly greater than about ¼ inch. The compression of the gypsum slurry through the extrusion wedge causes excessive slurry penetration through the mat and onto the supporting equipment. Adjustments to the slurry viscosity using viscosity control techniques are not able to eliminate the problem of excessive slurry bleed-through.

COMPARATIVE EXAMPLE 2

Comparative Example 1 is repeated except that the mat has a weight per unit of surface area of about 2.25 lbs. per 100 sq. ft.

The compression of the gypsum slurry through the extrusion wedge caused excessive slurry penetration through the mat and onto the supporting equipment. Adjustments to the slurry viscosity using viscosity control techniques are not able to eliminate the problem of excessive slurry bleed-through.

EXAMPLE 1

Comparative Example 1 is repeated except that the mat is formed in accordance with the present invention from fibers having a thickness (diameter) of about 13 microns. The mat has a weight per unit of surface area of about 2.1 lbs. per 100 sq. ft. The compression of the gypsum slurry through the extrusion wedge does not cause excessive slurry penetration through the mat and onto the supporting equipment. Adjustments to the slurry viscosity using viscosity control techniques are not required to prevent excessive slurry bleed-through.

EXAMPLE 2

Comparative Example 1 is repeated except that the mat is formed in accordance with the present invention from fibers having a thickness of about 13 microns. The mat has a weight per unit of surface area of about 1.95 lbs. per 100 sq. ft.

The compression of the gypsum slurry through the extrusion wedge does not cause excessive slurry penetration through the mat and onto the supporting equipment, but the extent of penetration is greater than Example 1 above. Adjustments to the slurry viscosity using viscosity control techniques are not required to prevent excessive slurry bleed-through.

EXAMPLE 3

Comparative Example 1 is repeated except that the mat is formed from fibers having a thickness of about 13 microns. The mat has a weight per unit of surface area of about 1.85 lbs. per 100 sq. ft.

The compression of the gypsum slurry through the extrusion wedge does not cause excessive slurry penetration through the central portions of the mat, but does cause excessive penetration through the edge portions of the mat.

The preferred embodiments described herein are intended to be illustrative, and not necessarily limiting of the scope of the invention. Other embodiments and variations will be apparent to those skilled in the art and may be made without departing from the spirit and scope of the invention as defined in the following claims.

What is claimed is:

1. A mat-faced gypsum board comprising:

(a) a gypsum-based core; and (b) a fibrous mat facing on at least one side of said core, said fibrous mat having a weight per unit surface area of greater than about 1.85 lb. per 100 sq. ft. and consisting essentially of inorganic fibers having a diameter of less than about 15 microns.

2. The mat-faced gypsum board of claim 1 wherein said gypsum-based core has a substantially uniform thickness of no greater than about 0.375 inch.

3. The mat-faced gypsum board of claim 2 wherein said fibrous mat consists essentially of inorganic fibers having a diameter of greater than about 10 microns.

4. The gypsum board of claim 1 wherein said inorganic fibers comprise glass fibers.

5. The gypsum board of claim 1 wherein said fibers have a diameter of about 13 microns.

6. An exterior finishing system comprising the gypsum board of claim 1.

7. An exterior insulation finishing system comprising the gypsum board of claim 1.

8. A roof deck system comprising the gypsum board of claim 1.

9. An interior lath system comprising the gypsum board of claim 1.

10. A door core comprising the gypsum board of claim 1.

11. A mat-faced gypsum board of the class having a gypsum-based core formed from a gypsum slurry compressed through an extrusion ratio of at least about 3:1, said board comprising:

(a) a gypsum-based core; and (b) a fibrous mat facing on at least one side of said core, said fibrous mat having a weight per unit surface area of greater than about 1.85 lb. per 100 sq. ft. and consisting essentially of inorganic fibers having a diameter of less than about 15 microns.

12. The mat-faced gypsum board of claim 11 wherein said fibrous mat consists essentially of inorganic fibers having a diameter of greater than about 10 microns.

13. The gypsum board of claim 11 wherein said inorganic fibers comprise glass fibers.

14. The gypsum board of claim 11 wherein said fibers have a diameter of about 13 microns.

15. An exterior finishing system comprising the gypsum board of claim 11.

16. An exterior insulation finishing system comprising the gypsum board of claim 11.

17. A roof deck system comprising the gypsum board of claim 11.

18. An interior lath system comprising the gypsum board of claim 11.

19. A door core comprising the gypsum board of claim 11.

20. A method of manufacturing of a gypsum board comprising:

(a) providing a porous fibrous mat having a weight per unit surface area of greater than about 1.85 lb. per 100 sq. ft. and consisting essentially of glass fibers having a diameter of less than about 15 microns;

(b) bringing a gypsum slurry into contact with said porous fibrous mat; and (c) exerting a compressive force on said slurry by exposing said mat and said slurry to an extrusion ratio of at least of about 3:1.

21. The method of claim 20 wherein said fibrous mat consists essentially of inorganic fibers having a diameter of greater than about 10 microns.

22. The method of claim 21 wherein said fibers have a diameter of about 13 microns.

23. An exterior finishing system comprising a gypsum board made according to the method of claim 20.

24. An exterior insulation finishing system comprising a gypsum board made according to the method of claim 20.

25. A roof deck system comprising a gypsum board made according to the method of claim 20.

26. An interior lath system comprising a gypsum board made according to the method of claim 20.

27. A door core comprising a gypsum board made according to the method of claim 20.

* * * * *

UNITED STATES PATENT AND TRADEMARK OFFICE
CERTIFICATE OF CORRECTION

PATENT NO.: 6,001,496

DATED: December 14, 1999

INVENTOR: Debbie O'HAVER-SMITH

It is certified that an error appears in the above-identified patent and that said Letters Patent is hereby corrected as shown below:

On the cover page, under "Related U.S. Application Data", delete "60/022,499" and insert --60/002,499--.

Signed and Sealed this

Twenty-sixth Day of September, 2000

*Attest:*

Q. TODD DICKINSON

*Attesting Officer*     *Director of Patents and Trademarks*